Patented Oct. 10, 1944

2,359,828

UNITED STATES PATENT OFFICE 2,359,828

METHODS OF SUBSTITUTING ALCOHOLIC HYDROXYL GROUPS BY BROMINE

Harold Davies, Rehovoth, Palestine

No Drawing. Application November 18, 1941, Serial No. 419,637. In Great Britain November 26, 1940

6 Claims. (Cl. 260—652)

This invention concerns a method of substituting alcoholic hydroxyl groups by bromine.

According to this invention, the hydroxy compounds to be converted are subjected to the simultaneous action of bromine and sulfur. These may be added separately to the hydroxy compound, or be mixed beforehand with one another, or a portion may be mixed previously and another amount of either or both of them added directly to the hydroxy compound.

The amount of hydroxy compound taken should preferably be somewhat in excess of one hydroxyl group for each atom of bromine. The amount of sulfur should suitably not, or substantially not, exceed one atom of sulfur for each atom of bromine and may, in a preferred embodiment of the invention, be even as small as one atom of sulfur for six atoms of bromine, that is, roughly 32 grams of sulfur for 480 grams of bromine.

If bromine and sulfur are mixed together before being incorporated with the alcohol, sulfur bromide, $S_2Br_2$, is formed, and any bromine present in excess thereover can be conceived as being dissolved in the sulfur bromide in which it is readily soluble. Moreover, it has been found that a mixture of six atomic proportions of bromine with one atomic proportion of sulfur behaves differently from mixtures containing lower proportions of bromine, as though it were a hypothetical sulfur hexabromide, $SBr_6$. Whereas, for example, with $S_2Br_2$, elementary sulfur and sulfur dioxide are formed by reaction with alcohol, apparently according to the equation:

the reaction with the hypothetical hexabromide apparently follows the equation:

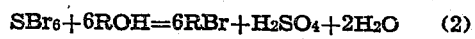

In both equations, R stands for an alkyl or other radical capable of carrying an alcoholic hydroxyl group.

If bromine and sulfur are separately added to the hydroxy compound, for example by suspending finely divided sulfur in the alcohol and dropping the bromine in, an intermediary formation of sulfur bromide may be assumed to take place.

Having regard to the foregoing, the invention may be said to consist in the substitution of alcoholic hydroxyl groups by bromine by means of sulfur bromide, or a mixture of sulfur bromide with bromine or sulfur, as the case may be, and preferably with a mixture having the empirical composition of the hypothetical sulfur hexabromide, $SBr_6$.

In carrying out this invention, concentrated sulfuric acid may be added to the reaction mixture in order to facilitate the reaction but this is by no means indispensable. Where the reaction proceeds in accordance with Equation (2) above, that is, where sulfuric acid forms during the reaction, an excess of alcohol combines with the latter with the formation of a hydrogen sulfate. Especially in the case of lower alkyl alcohols, the corresponding alkyl hydrogen sulfates are obtained as by-products and may be used for the preparation of ethers in a manner known per se. If the main product, that is, the alkyl bromide, is distilled off from the reaction mixture, the alkyl hydrogen sulfate remains in the residue.

The following examples illustrate how the invention may be carried out:

Example 1

112 grams of sulfur bromide, prepared by dissolving 32 grams of sulfur in 80 grams of bromine and then cooling to ordinary temperature, are added gradually to a mixture of 100 grams of ordinary 95% ethyl alcohol and 10 grams of concentrated sulfuric acid contained in a flask under reflux condenser. When all the sulfur bromide has been added, the mixture is heated gently by boiling so that the ethyl bromide can distil over as quickly as it is formed, whereas unchanged alcohol is refluxed into the reaction flask. When the reaction is finished the distillate, containing ethyl bromide, sulfur dioxide and a little alcohol, is washed with water and sodium hydroxide, dried with calcium chloride and distilled. The yield of ethyl bromide is 74 grams.

Example 2

70 grams of sulfur (i. e. 10% in excess of 2 gram atoms) are dissolved in 960 grams of bromine (i. e. 12 gram atoms); after cooling the mixture to room temperature it is added gradually, through a dropping funnel, to 1200 cc. of ordinary 95% ethyl alcohol contained in a flask under reflux condenser. External heating is unnecessary at the start, as the heat of the reaction soon raises the temperature of the reaction mixture to boiling, and the ethyl bromide is allowed to distil over and be condensed in a cooled receiver. When all the sulfur-bromine mixture has been added, the contents of the reaction flask are kept gently boiling by external heating until the reaction is complete and all the ethyl bromide has passed over into the receiver. The crude product in the distillate is washed with water and sodium hydroxide solution, dried with calcium chloride and distilled, when a yield of 1202 grams of ethyl bromide boiling at 37-39° C. is obtained corresponding to a yield of 92% of the theoretical calculated on the bromine taken.

*Example 3*

12 grams of sulfur are dissolved in 160 grams of bromine, the mixture is cooled to ordinary temperature and then added gradually to 149 grams (i. e. 2 gram molecules) of normal butyl alcohol contained in a flask under reflux condenser. When all the sulfur-bromine mixture has been added, the contents of the reaction flask are kept boiling gently under reflux for about an hour to complete the reaction. The reaction product, after cooling, is shaken with water to remove sulfuric acid, hydrobromic acid and unchanged butyl alcohol, then washed with dilute alkali, dried with calcium chloride and distilled. The yield of normal butyl bromide is 235 grams boiling at 98°-103° C.

*Example 4*

30 grams of sulfur are dissolved in 400 grams of bromine, and this mixture, after cooling, is added gradually to 400 cc. of methyl alcohol contained in a flask under reflux condenser. The heat of the reaction soon raises the temperature of the reaction mixture to boiling and the methyl bromide is allowed to distil over as rapidly as it is formed, and is collected in a receiver containing 400 grams of methyl alcohol in ice. When all the sulfur-bromine mixture has been added, the contents of the reaction flask are kept boiling gently under reflux until methyl bromide ceases to be evolved. The increase in weight of the contents of the receiver is 479 grams, which allowing for a small quantity of methyl alcohol carried over by the methyl bromide, corresponds nearly to a theoretical yield calculated on the bromine taken.

If preferred, the methyl bromide can, of course, be absorbed in any other desired solvent or, after suitable purification, condensed in the pure condition.

I claim:

1. A process of substituting alcoholic hydroxyl groups by bromine wherein the hydroxy compound is subjected under a pressure not higher than ordinary pressure to the simultaneous action of bromine and sulfur.

2. A process as claimed in claim 1, wherein bromine and sulfur are added separately to the hydroxy compound.

3. A process as claimed in claim 1, wherein the whole of the bromine and sulfur used for the reaction is mixed beforehand and the mixture is added to the hydroxy compound.

4. A process of substituting alcoholic hydroxyl groups by bromine, comprising subjecting the hydroxy compound under a pressure not higher than ordinary pressure to the simultaneous action of bromine and sulfur, the sulfur being used in a proportion substantially not exceeding one gram atom of sulfur to each gram atom of bromine.

5. A process as claimed in claim 4, wherein the proportion of sulfur to bromine is substantially one gram atom of sulfur to six gram atoms of bromine.

6. A process of substituting alcoholic hydroxyl groups by bromine, comprising preparing a mixture under a pressure not higher than ordinary pressure of sulfur and bromine in the proportion of one gram atom of sulfur to six gram atoms of bromine and adding the mixture to an excess of the hydroxy compound to be converted.

HAROLD DAVIES.